US008639181B2

(12) United States Patent
Caplin et al.

(10) Patent No.: US 8,639,181 B2
(45) Date of Patent: Jan. 28, 2014

(54) LUNAR COMMUNICATIONS SYSTEM

(75) Inventors: Glenn N. Caplin, Manhattan Beach, CA (US); James D. Thompson, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 1481 days.

(21) Appl. No.: 11/968,271

(22) Filed: Jan. 2, 2008

(65) Prior Publication Data

US 2011/0097995 A1    Apr. 28, 2011

Related U.S. Application Data

(60) Provisional application No. 60/886,555, filed on Jan. 25, 2007.

(51) Int. Cl.
*H04B 7/185*    (2006.01)
(52) U.S. Cl.
USPC ........................................................ 455/12.1
(58) Field of Classification Search
USPC ........................................................ 455/12.1
See application file for complete search history.

(56) References Cited

U.S. PATENT DOCUMENTS

| | | | | |
|---|---|---|---|---|
| 3,638,882 A * | 2/1972 | Turriere | ................ | 244/158.1 |
| 5,169,094 A * | 12/1992 | Maute et al. | ................ | 244/158.1 |
| 5,929,820 A * | 7/1999 | Caulfield et al. | ................ | 343/761 |
| 6,201,961 B1 * | 3/2001 | Schindall et al. | ................ | 455/430 |
| 7,006,462 B2 * | 2/2006 | Asai | ................ | 370/316 |
| 7,184,761 B1 * | 2/2007 | Wang | ................ | 455/427 |
| 2006/0038083 A1 * | 2/2006 | Criswell | ................ | 244/172.7 |

* cited by examiner

*Primary Examiner* — Yuwen Pan
*Assistant Examiner* — Ankur Jain
(74) *Attorney, Agent, or Firm* — Charles L. Moore; Moore & Van Allen PLLC

(57) ABSTRACT

A system for communications between a lunar or planetary surface and the Earth may include a first communications satellite adapted to be positioned in a predetermined orbit relative to a celestial body. A first antenna may be mounted on the first communications satellite. The first antenna may include a predetermined beam shape for communications between the first communications satellite and an asset on the lunar or planetary surface. A second antenna may also be mounted on the first communications satellite. The second antenna may include a selected beam shape for communications between the first communications satellite and the Earth. A communications system may be included for relaying communications between the first and second antennas.

28 Claims, 7 Drawing Sheets

LUNAR COMMUNICATIONS SYSTEM

This application claims benefit of priority under 35 U.S.C. §119(e) to the filing date of U.S. Provisional Application 60/886,555, filed on Jan. 25, 2007, which is incorporated herein by reference in its entirety.

BACKGROUND OF THE INVENTION

The present invention relates to communications, communications systems and the like, and more particularly to a lunar or planetary communications system for use in relaying communications between the surface of the moon or other celestial body and the Earth.

Communications with an asset, such as a sensor, probe, robotic lander, observatory or similar device, on the surface of a celestial body, such as the moon or planet, at a pole of the celestial body may be limited due to line of sight constraints between the Earth and the lunar or planetary poles. Additionally, communications from within a crater of interest at one of the poles of the moon may be further constrained by the crater walls resulting in no line of sight between the interior of the crater and the Earth. Further, the farside of the moon or other celestial body may always be out of the line of sight to the Earth. Thus, direct communications to an asset on the surface of the moon or other celestial body may be either partially or totally obscured. With respect to the moon, total obscuration from the poles is caused by line of sight limitations, i.e., not being able to view below the horizon. The moon's rotational axis tilt causes the Earth to appear above the horizon for part of the month and below the horizon for the remainder of the month as viewed by an observer on the lunar polar surface. And as noted above, within a crater the crater walls may totally obscure line of sight even during the most favorable part of the lunar orbit.

BRIEF SUMMARY OF THE INVENTION

In accordance with an embodiment of the present invention, a system for communications between a lunar or planetary surface and the Earth may include a first communications satellite adapted to be positioned in a predetermined orbit relative to a celestial body. A first antenna may be mounted on the first communications satellite. The first antenna may include a predetermined beam shape for communications between the first communications satellite and an asset on the lunar or planetary surface. A second antenna may also be mounted on the first communications satellite. The second antenna may include a selected beam shape for communications between the first communications satellite and the Earth. A communications system or communications repeater may be included for relaying communications between the first and second antennas.

In accordance with another embodiment of the present invention, a communications satellite for communications between a lunar or planetary surface and the Earth may include a first antenna mounted on the communications satellite. The first antenna may include a predetermined beam shape for communications between the communications satellite and an asset on the lunar or planetary surface. A second antenna may also be mounted on the communications satellite. The second antenna may include a selected beam shape for communications between the communications satellite and the Earth. A communications system or communications repeater may be provided for relaying communications between the first and second antennas.

In accordance with another embodiment of the present invention, a method for communications between a surface of a celestial body and the Earth may include providing a substantially conically shaped beam for communications between at least a communications satellite and an asset on the surface of the celestial body. The method may also include providing a substantially toroidally-shaped beam for communications between at least the communications satellite and the Earth. The method may further include relaying communications between a first antenna configured for providing the substantially conically shaped beam and a second antenna configured for providing the substantially toroidally-shaped beam.

In accordance with a further embodiment of the present invention, a system for communication between a lunar or planetary surface and the Earth may include a simple spinning spacecraft or satellite provisioned to align a spin axis of the spacecraft substantially perpendicular to (or nearly perpendicular to) the plane of the lunar or planetary orbit. Depending on the relative strength of the communications links from the surface to the spacecraft and from the spacecraft to the earth and if the polar axis is nearly perpendicular to the orbit plane (in the case of the moon, it is tilted about 1.5 degrees), it may be advantageous to have the spin axis parallel to the lunar polar axis. The spacecraft may be placed in a lunar or planetary polar orbit. The resulting orbit and inertially fixed attitude created by the spin sets a geometry which provides a simple relay solution and spacecraft design. A first spacecraft antenna normally adapted to communicate with an asset on the lunar or planetary surface may be configured to provide or generate a substantially conical pattern. A second spacecraft antenna normally adapted to communicate with the Earth may be configured to provide or generate a substantially toroidal pattern. Taken together with the fixed geometry established by the spin vector, a communications link may be established from either pole of the moon or celestial body without any moving parts on the spacecraft, such as tracking antennas or other components.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
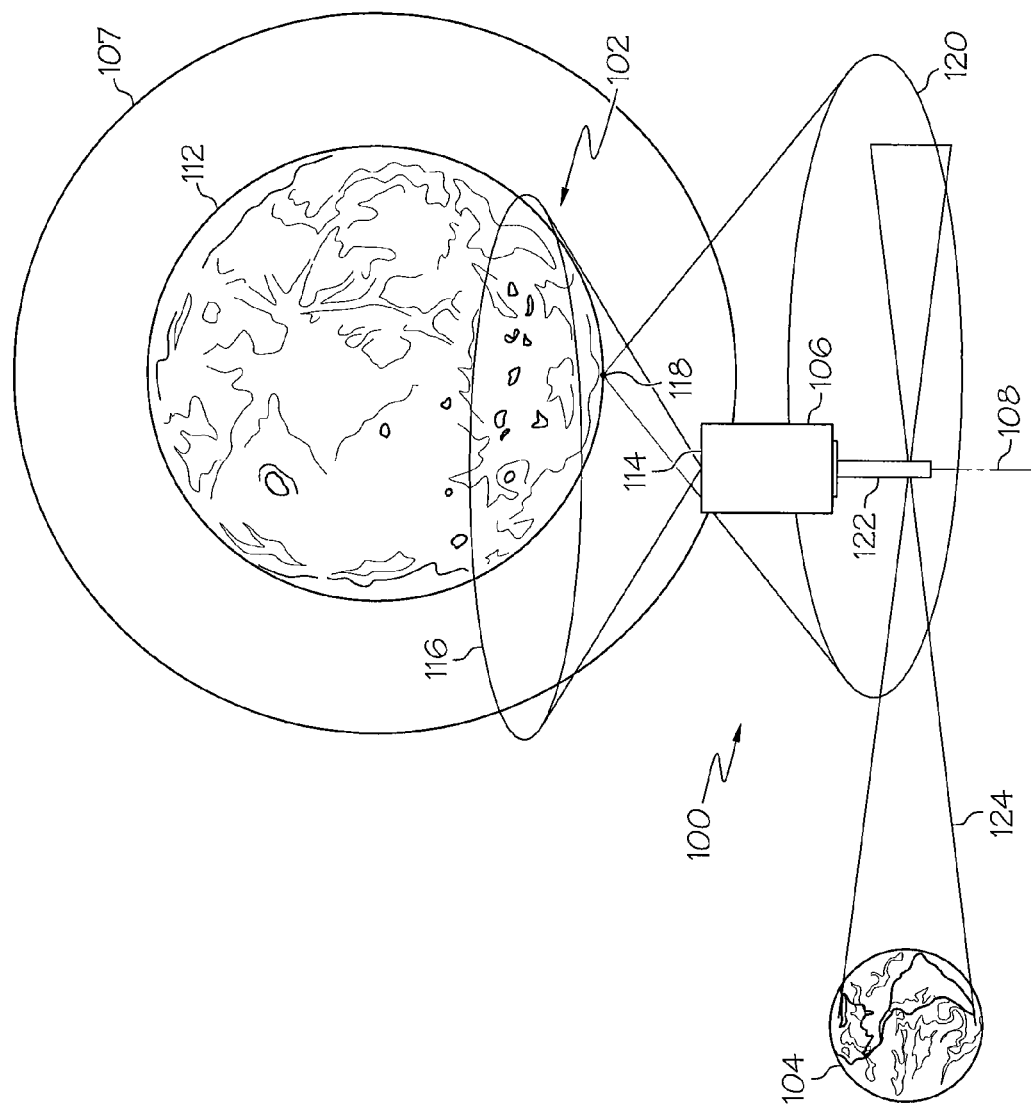
FIG. 1 is an illustration of an example of a system for communications between a lunar or planetary surface and the Earth in accordance with an embodiment of the present invention.

FIG. 1 is an illustration of an example of a system 100 for communications between a lunar or planetary surface 102 and the Earth 104 in accordance with an embodiment of the present invention. As will be described, the system 100 provides a communications link for lunar surface assets to Earth from the lunar polar region that nominally are partially or totally obscured from Earth view. The system 100 may include one or more lunar relay communications satellites (LRCS) 106 that are placed in a predetermined lunar polar orbit. The predetermined lunar polar orbit may be a substantially circular orbit 107 for a single communications satellite or the orbit may be substantially elliptical. Each communications satellite 106 or spacecraft may be spun to provide an inertially fixed attitude which substantially aligns a spin axis 108 of the communications satellite 106 perpendicular to the orbit plane of the moon 112 or other celestial body. The orbit plane may correspond substantially to a plane defined by the path or orbit traversed by the moon 112 around the Earth. The communications satellite 106 may include a first antenna 114 configured to provide a predetermined beam shape 116 for communications between the communications satellite 106 and an asset 118 on the lunar or planetary surface 102. The first antenna 114 may include a configuration to provide or generate the predetermined beam shape which may be a broad, substantially conically shaped beam 116 as illustrated in FIG. 1. The first antenna 114 may be a conical ultra high frequency (UHF) circularly-polarized antenna or a similar antenna for communications with the lunar surface 102. The conical beam spread may be about 120 degrees. The asset 118 may include an antenna (not shown in FIG. 1) to also provide or generate a broad, substantially conically shaped beam 120 to provide a maximum amount of overlap between the beams 116 and 120 during each polar orbit of the communications satellite 106. In this inertially fixed attitude, the first antenna 114 or broad, substantially conical beam antenna may view the South Pole of the moon during each orbit or the North Pole by inverting the communications satellite 106 using a propulsion system or subsystem (not shown in FIG. 1) as described in more detail herein with reference to FIGS. 5 and 7.

The communications satellite 106 may also include a second antenna 122. The second antenna 122 may be configured to provide or generate a selected beam shape 124 for communications between the communications satellite 106 and the Earth 104. The selected beam shape 124 may be a substantially toroidally-shaped beam. The second antenna 122 may be a toroid X-band antenna with about a 3 degree beam pattern or another antenna for generating a similar pattern for communications with the Earth. For this embodiment of the present invention, an Earth station (not shown in FIG. 1) for receiving signals on the Earth from the satellite 106 may be a 34 meter X-band Deep Space Network (DSN) station or similar type station or antenna system.

The second antenna 122 or toroidal-beam antenna may be mounted on an opposite end of the communications satellite 106 from the first antenna 114 in order to provide a clear, unobstructed view or line-of-sight to Earth 104. A communications system or simple communications repeater (not shown in FIG. 1) may be provided to allow data transmitted from the asset 118 on the lunar or planetary surface 102 to be relayed through the communications satellite 106 to Earth 104, as well as providing a communications link from the Earth 104 to the asset 118 on the lunar or planetary surface 102. An example of a communications system or communications repeater that may be used with the system 100 will be described in more detail with reference to FIGS. 5 and 6. The communications system may facilitate some form of multiple access, such as time division multiple access (TDMA), code division multiple access (CDMA), internet protocol (IP) network or other access technologies.

The spinning communications satellite 106 provides an extremely simple, highly reliable and low cost solution for communications from any obscured lunar surface 102 to Earth 104 or from any planetary or other celestial body surface to Earth 104. Those skilled in the art may recognize that the spin-stabilized communications satellite 106 of this embodiment of the present invention may avoid higher cost life and reliability technologies normally found on conventional body stabilized designs. The spin-stabilized embodiment of the communication satellite 106 may also not require tracking mechanisms (as needed for a solar array or antenna), complex attitude sensors, such as star trackers, inertial reference units or similar devices, bearings, momentum wheels or the like, and flight computers and associated software. In addition, the thermal design and propulsion subsystem may both be greatly simplified as described herein.

The asset 118 on the lunar or planetary surface 102 may include a simple, uncoded, low power (about 1 watt) transceiver with a low gain antenna or the like, such as those normally associated with a penetrator, mortar fired sensor or similar apparatus. The asset 118 may also be a coded, relatively low power (about 30 watts), fixed gain device with about a 120 degree conical antenna. Examples of such devices or assets may include a robotic lander, rover or similar device. Other examples of surface assets 118 may include a robotic emplacement, an observatory, a fixed lunar base, lunar lander or similar devices or apparatus which may include higher power transmitters and tracking antennas.

Further, the one or more relay communications satellites 106 may be attached and subsequently deployed from an Evolved Expandable Launch Vehicle (EELV) Secondary Payload Adapter (ESPA) or similar vehicle.

Figure 2:
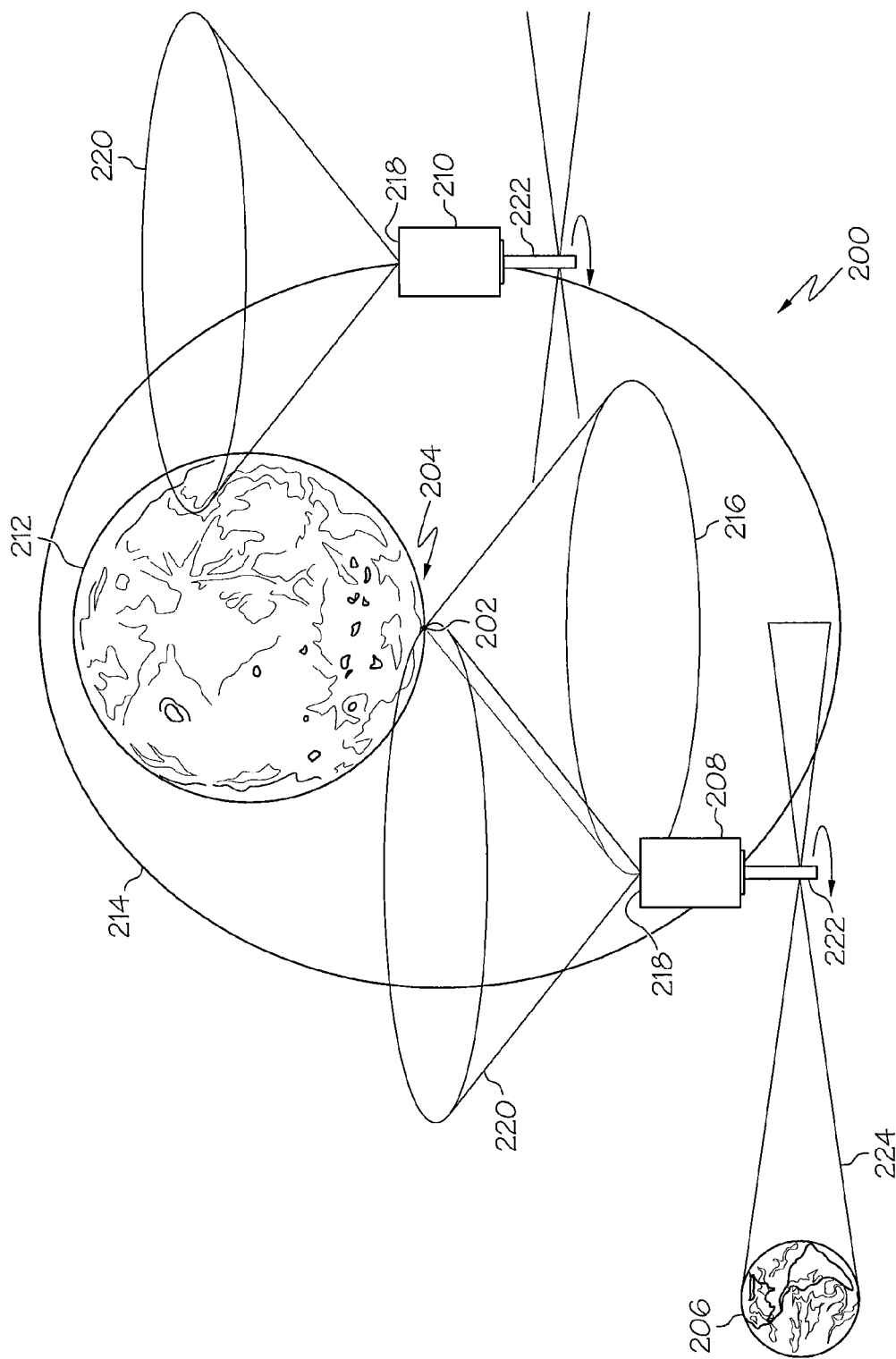
FIG. 2 is an illustration of an example of a system for communications between a lunar or planetary surface and the Earth in accordance with another embodiment of the present invention.

FIG. 2 is an illustration of an example of a system 200 for communications between an asset 202 on a lunar or planetary surface 204 and the Earth 206 in accordance with another embodiment of the present invention. The system 200 may include a first communications satellite 208 and a second communications satellite 210. The satellites 208 and 210 may be similar to the communications satellite 106 of FIG. 1. The first and second communications satellites 208 and 210 may be positioned in a predetermined orbit relative to the celestial body 212 and relative to each other to provide substantially maximum communications coverage. The predetermined orbit may be a substantially eccentric or elliptical polar orbit 214. The satellites 208 and 210 may be phased about 180 degrees apart such that one satellite is always in a surface antenna pattern 216 of the asset 202. Each of the satellites 208 and 210 may be spin-stabilized similar to that described with respect to the satellite 106 of FIG. 1 with a satellite spin axis substantially perpendicular to the orbit of the celestial body 212.

As illustrated in FIG. 2 each communications satellite 208 and 210 may include a first antenna 218 directed to the lunar or planetary surface 204 with a pattern or beam 220 similar to the pattern or beam 216 from the asset 202. The beams 216 and 220 may each be a substantially conically shaped beam or pattern.

Similar to the satellite 106 of FIG. 1, each of the satellites 208 and 210 may include a second antenna 222 for communications between each of the satellites 208 and 210 and the earth 206. Each second antenna may be configured to produce or generate a substantially toroidally-shaped beam or pattern 224.

Figure 3:
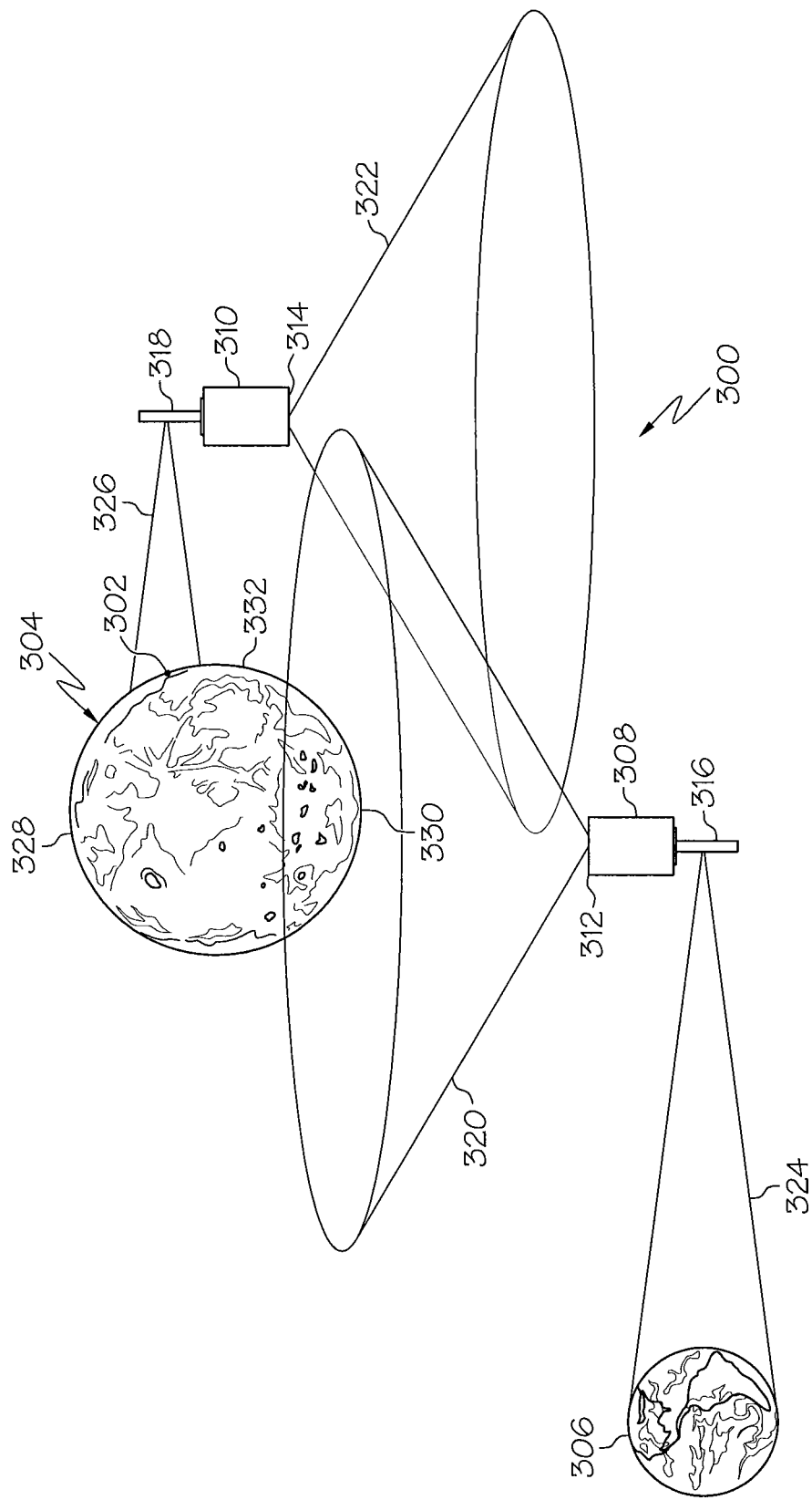
FIG. 3 is an illustration of an example of a system for communications between a lunar or planetary surface and the Earth in accordance with yet another embodiment of the present invention.

FIG. 3 is an illustration of an example of a system 300 for communications between an asset 302 on a lunar or planetary surface 304 and the Earth 306 in accordance with another embodiment of the present invention. The system 300 may include a first communications satellite 308 and at least a second communications satellite 310. The first and second communications satellites 308 and 310 may be spin-stabilized with a spin axis substantially perpendicular to the orbit of the celestial body. The first and second communications satellites 308 and 310 and may each be similar to the communications satellite 106 in FIG. 1. Accordingly, the first and second communications satellites 308 and 310 may each respectively include a first antenna 312 and 314 and a second antenna 316 and 318. Each first antenna 312 and 314 may be configured to generate a substantially conical beam 320 and 322, respectively. Each second antenna 316 and 318 may be configured to provide or generate a substantially toroidally-shaped beam 324 and 326, respectively. The second communications satellite 310 may be inverted or oriented in a lunar North Pole relay attitude so that the substantially conically-shaped beam 322 may provide broad coverage of the lunar North Pole area 328 during each orbit. The first communications satellite 308 may be oriented in a lunar South Pole relay attitude so that the substantially conically-shaped beam 320 may provide broad coverage of the lunar South Pole area 330. The second communications satellite 310 may have an opposite frequency plan relative to the first communications satellite 308.

As illustrated in FIG. 3, this embodiment may provide communications coverage on a farside 332 of the celestial body or side opposite to the Earth 306 as well as coverage at both poles 328 and 330. The communications coverage may be achieved via a double-hop relay system as illustrated in FIG. 3. The second communications satellite 310 may communicate with the asset 302 on the farside 332 of the celestial body with the second antenna 318 and toroidal beam 326. The second communications satellite 310 may then relay the communications to the first communications satellite 308. The first and second communications satellites 308 and 310 may communicate with one another via the first antennas 312 and 314 and conical beams 320 and 322, respectively. The first communications satellite 308 may then communicate with the Earth via its second antenna 316 which produces or generates the toroidal beam 324.

Accordingly, the second antenna 318 or toroid antenna of the second satellite 310 nominally used for Earth communications may be reused for lunar farside communications. The first antenna 314 or conical antenna of the second satellite 310 normally used for north polar communications by the second communications satellite 310 may be used for communications to the first antenna 312 or conical antenna of the first communications satellite 308 which is normally used for south pole communications.

The farside or second satellite 310 appears to the first or south polar satellite 308 similar to a surface asset. The frequency plans of the satellites may be switched with either dedicated north or south pole satellites or by making the satellites 308 and 310 configurable to either frequency plan and switchable according to the orbital position of the respective satellites.

Figure 4:
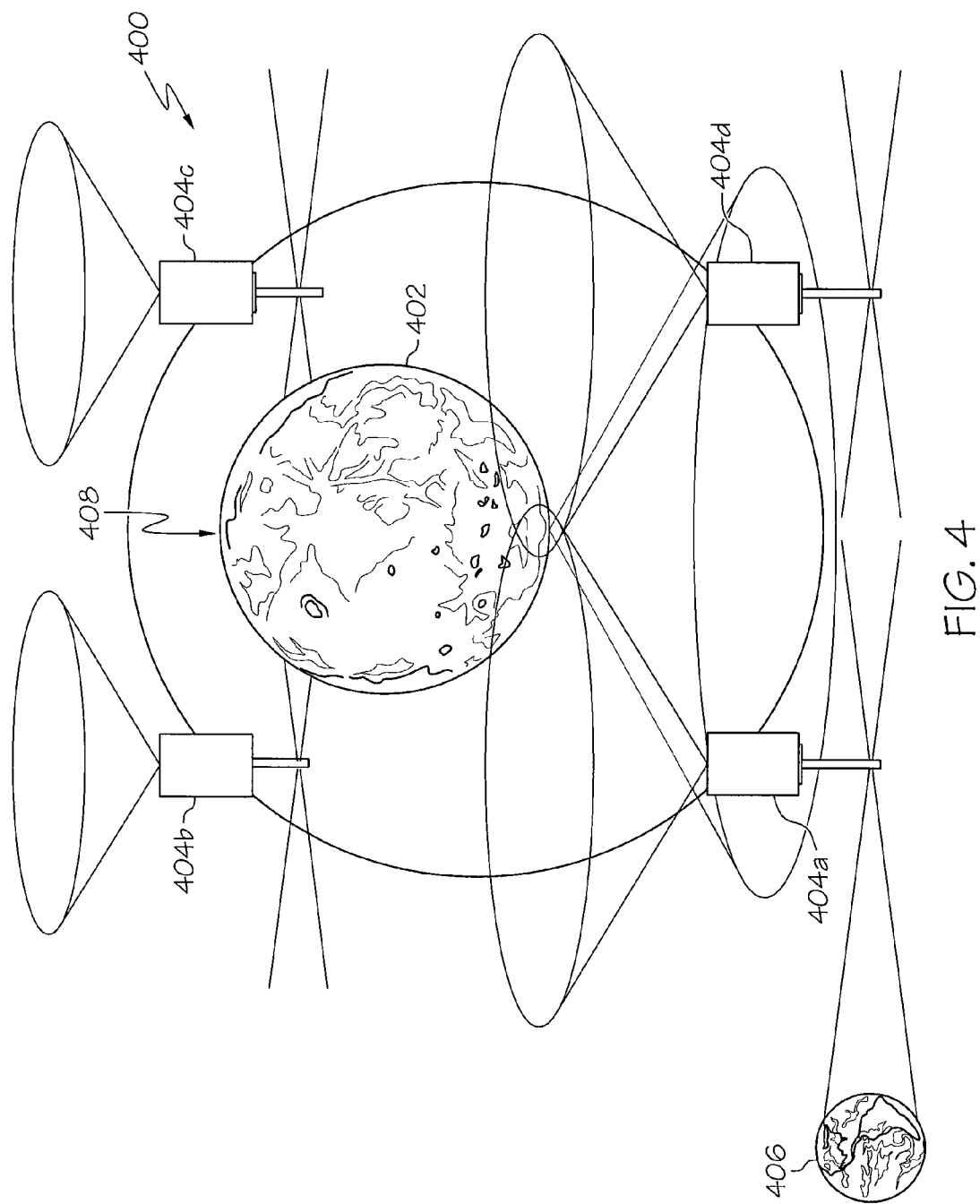
FIG. 4 is an illustration of an example of a system for communications between a lunar or planetary surface and the Earth in accordance with a further embodiment of the present invention.

FIG. 4 is an illustration of an example of a system 400 for communications between a lunar or planetary surface 402 and the Earth 406 in accordance with a further embodiment of the present invention. The system 400 may provide substantially complete and continuous coverage of the lunar or planetary polar surface. The system 400 may include at least four communications satellites 404a-404d. Each of the satellites 404a-404d may be similar to the communications satellite 106 in FIG. 1 and may be spin-stabilized with a spin axis substantially perpendicular to the orbit of the celestial body 408. Each of the satellites 404a-404d may be positioned in a predetermined obit relative to the celestial body 408 and relative to one another or each of the satellites 404 may be phased to provide substantially complete and continuous coverage with an asset on the lunar or planetary polar surface 402. The satellites 404a-404d may be configured to provide a double-hop relay system for substantially continuous communications coverage of both poles and the farside of the celestial body 408 from the earth 406. The predetermined orbit may be a substantially polar circular orbit and the satellites may be phased to provide substantially continuous communications coverage.

Figure 5:
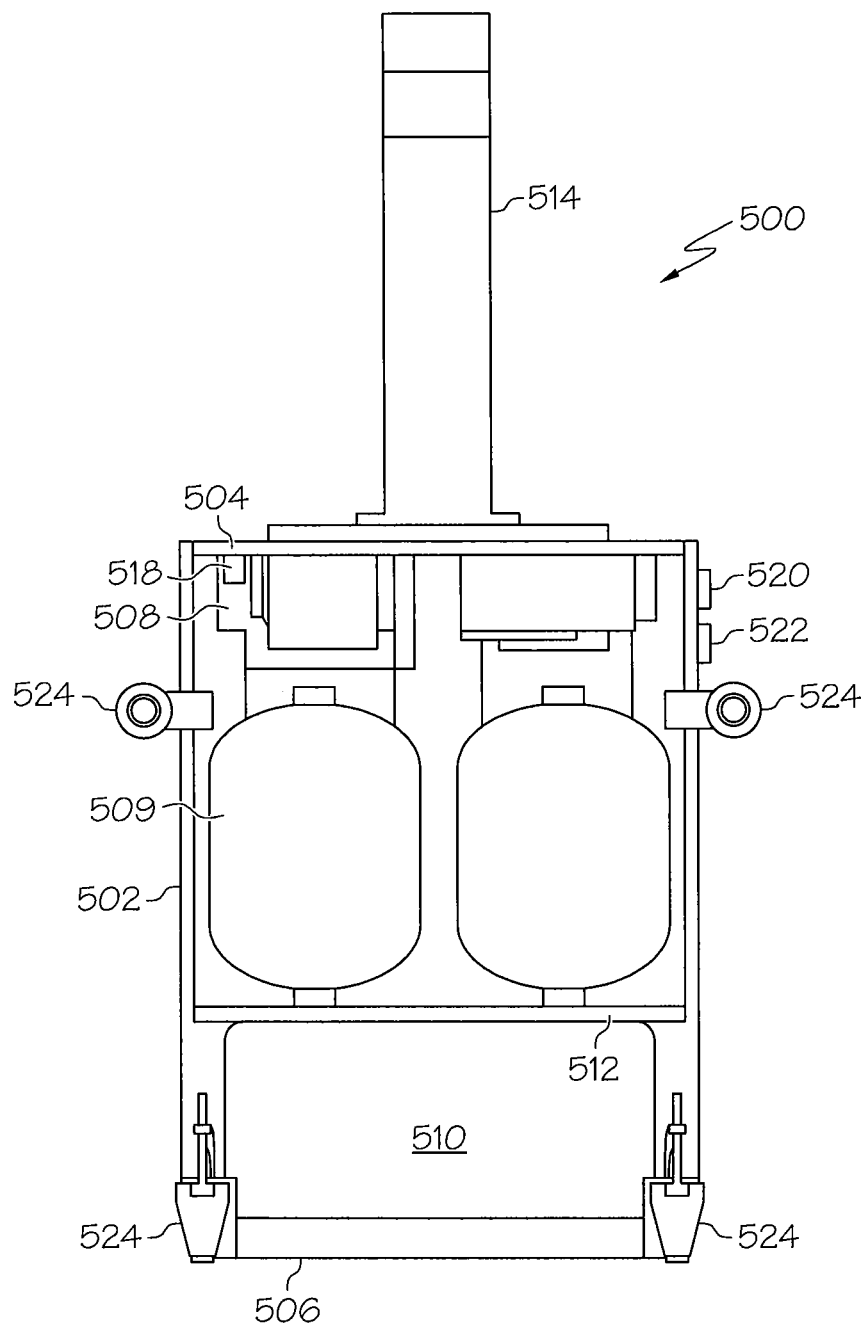
FIG. 5 is an illustration of an example of a communications satellite or spacecraft for communications between a lunar or planetary surface and the Earth in accordance with an embodiment of the present invention.

FIG. 5 is an illustration of an example of a communications satellite 500 for communications between a lunar or planetary surface and the Earth in accordance with an embodiment of the present invention. The communications satellite 500 may be used for the communications satellite 106 of FIG. 1, communications satellites 208 and 210 of FIG. 2, satellites 308 and 310 of FIG. 3 and satellites 404 of FIG. 4. The communication satellite 500 may be constructed as a square spinner with exterior panels 502 that may accommodate triple junction gallium arsenide (GaAs) solar cell arrays (not shown in FIG. 5). An internal cruciform provides the primary load path. Two closeout panels 504 and 506 may complete the structure. In other embodiments, the satellite may be constructed as a cylindrical spinner or other geometric shape.

The upper closeout panel 504 or forward equipment panel also provides mounting space for all control and communications systems or subsystems 508 on the interior side and may be a thermal radiator for dissipating waste heat on an external surface. A thermal control subsystem (not shown) may be provided to control a temperature of components and other subsystems of the communications satellite 500. The control and communications subsystems 508 will be described on more detail with reference to FIG. 6. Propellant tanks 509 may be mounted beneath the control and communications subsystems 508.

A first antenna 510 for generating a substantially conically-shaped beam or pattern similar to that previously described for satellite-to-lunar or planetary surface communications may be mounted directly beneath an aft closeout panel 512. The antenna 510 may be a 350 MHz UHF orbiter-to-lunar surface cup dipole antenna or the like and may be mounted such that there is no hardware obstructing the field of view (FOV).

A second antenna 514 for generating a substantially toroidally-shaped beam or pattern similar to that previously described may be mounted to the forward equipment panel 504. The second antenna 514 may be an X-band stacked bicone array antenna or similar antenna that may provide Earth coverage. Low gain telemetry and command antennas 518 as described in more detail with reference to FIG. 6 may be mounted forward and aft to provide nearly $4\pi$ steradian coverage for mission and contingency operations. Sun and moon sensors 520 and 522 may be mounted to the satellite body to establish the spin axis attitude. Propulsion jets or thrusters 524 may also be appropriately positioned on the satellite 500 to control attitude and spin rate of the satellite 500.

Figure 6:
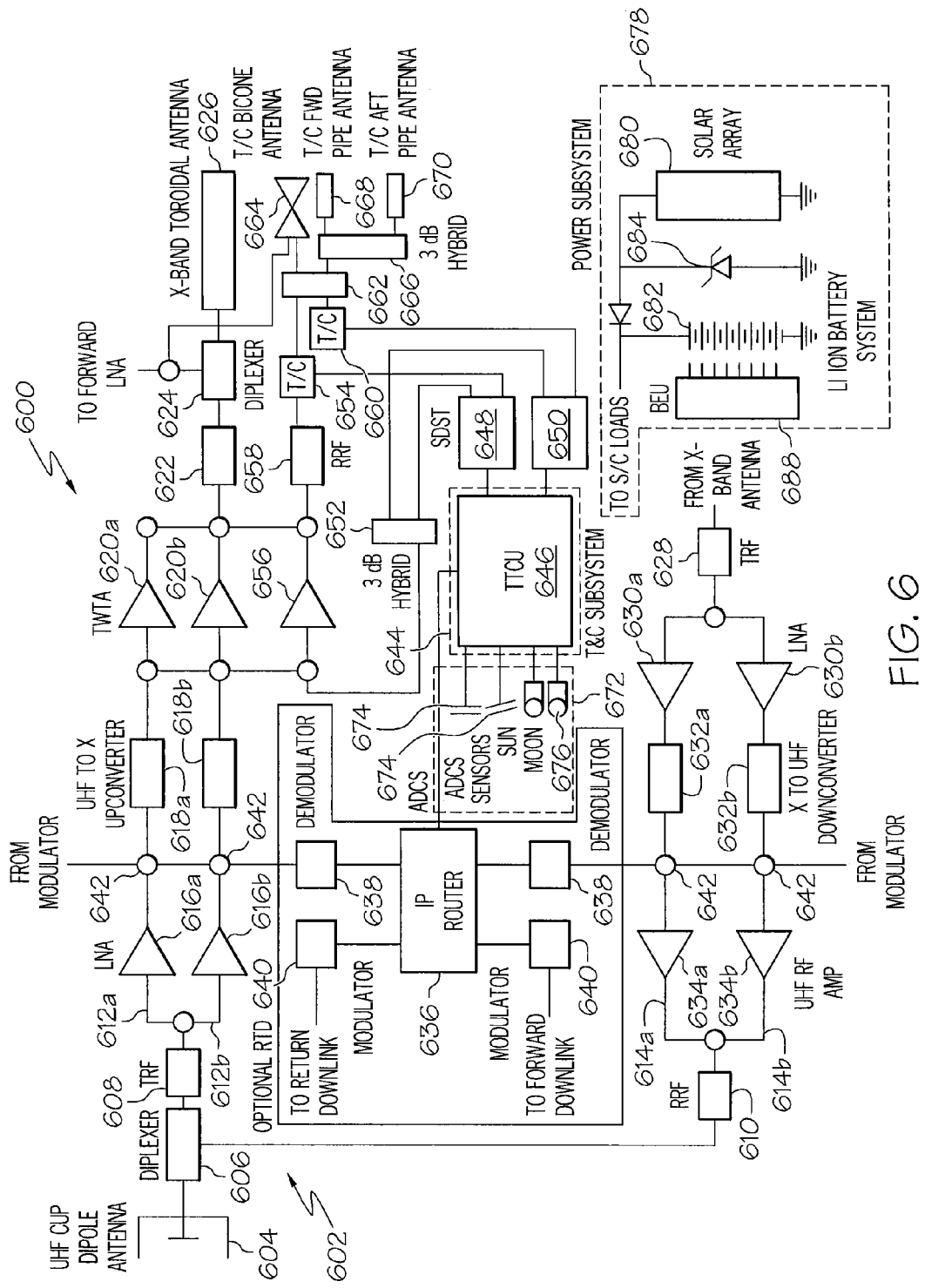
FIG. 6 is a block schematic diagram of an example of communications and control subsystems and circuitry for a communications satellite for communications between a lunar or planetary surface and the Earth in accordance with an embodiment of the present invention.

FIG. 6 is a block schematic diagram of an example of communications and control subsystems or circuitry 600 for a communications satellite, such as the satellite 500 of FIG. 5, for communications between a lunar or planetary surface and the Earth in accordance with an embodiment of the present invention. The circuitry 600 includes a communications or telecommunications subsystem 602. The telecommunications subsystem 602 may include or define a communications repeater. The telecommunications subsystem 602 may include a first antenna 604 that may be an ultra high frequency (UHF) cup dipole antenna or similar antenna. As previously described, the first antenna 604 or cup dipole antenna may provide or generate a substantially conically-shaped beam for communications between the communications satellite and an asset on a lunar or planetary surface.

The cup dipole antenna 604 may be diplexed by a diplexer 606 to provide both transmit and receive functions for lunar surface assets. Isolation may be provided by diplexer filters and a transmit reject filter (TRF) 608 and receive reject filter (RRF) 610 within the repeater or telecommunications subsystem 602.

The telecommunications subsystem 602 may include redundant return or transmit communications or signal paths 612*a* and 612*b*, and redundant forward or receive communications or signal paths 614*a* and 614*b*. Each return communications path 612*a* and 612*b* may include a low noise amplifier (LNA) 616*a* and 616*b* coupled to the transmit reject filter 608. Each LNA 616*a* and 616*b* may be coupled to a UHF to X band upconverter 618*a* and 618*b*, respectively, and each upconverter 618*a* and 618*b* may be coupled to a traveling wave tube amplifier (TWTA) 620*a* and 620*b*. Each of the TWTAs 620*a* and 620*b* may be coupled to a receive reject filter (RRF) 622 which may be coupled to a diplexer 624. The diplexer 624 may be coupled to a second antenna 626 for communications with the Earth. The diplexer permits reception of forward data from the Earth and transmission of return data from the lunar surface and vice versa. As previously described the second antenna 626 may provide or generate a substantially toroidally-shaped beam or pattern for communications with the Earth. The second antenna 626 may be the X-band toroidal antenna or similar antenna.

In the forward or receive paths 614*a* and 614*b*, the X-band toroidal antenna 626 may be coupled to a transmit reject filter (TRF) 628. The TRF 628 may be coupled to a low noise amplifier (LNA) 630*a* and 630*b* in each receive or forward communications path 614*a* and 614*b*. Each LNA 630*a* and 630*b* may be coupled to an X to UHF downconverter 632*a* and 632*b*. Each downconverter 632*a* and 632*b* may be coupled to a UHF radio frequency (RF) amplifier 634*a* and 634*b*. Each UHF RF amplifier 634*a* and 634*b* may be coupled to the RRF 610 which is coupled to the diplexer 606 of the cup dipole antenna 604.

The UHF cup-dipole antenna 604 may produce a single circular polarized signal from a single feed port using two orthogonal dipoles of different lengths fed from the same input transmission line. This antenna may produce a broad radiation pattern with approximately 6.5 dBi gain at boresight and 1.5 dBi at 60° from the boresight. The body of the antenna 604 may be aluminum with several small thermoplastic pieces to support the inner conductor of the input transmission line. The thermoplastic pieces may be a polyimide thermoplastic resin, such as Ultem or the like. Ultem is a trademark of the General Electric Company in the United States, other countries or both.

The toroidal antenna 626 may be a high gain toroidal antenna and may include a slot array around a cylinder feeding a meanderline polarizer. Alternately, antenna 626 may be a stacked bicone array or other antenna configuration which produces a toroidal pattern.

In accordance with an embodiment of the present invention, an Internet Protocol (IP) router 636 may be provided along with associated demodulators 638 and modulators 640. The demodulators 638 and modulators 640 may be switched in or out of the path via the four position redundancy switches 642. If the IP router 636 is switched in, complete IP interconnectivity may be achieved between all lunar, satellite and Earth assets. If switched out, the communications subsystem 602 may perform as a traditional relay repeater.

The communications and control circuitry 600 may also include a telemetry and command subsystem 644. The telemetry and command (T&C) subsystem 644 may include an internally redundant telemetry, command and control unit (TCCU) 646. The TTCU 646 provides a data interface between first and second small deep space transponders (SDSTs) 648 and 650 and the remainder of the satellite circuitry 600. The SDSTs 648 and 650 provide command reception and demodulation, telemetry modulation and transmission, and turnaround ranging. Timing circuits within the TTCU 646 allow ground computation for spin phase thruster commands to be uploaded and executed.

The first and second SDSTs 648 and 650 may be coupled to a 3 db hybrid 652 and a telemetry and command (T/C) diplexer 654. The 3 db hybrid 652 may be coupled to a traveling wave tube amplifier (TWTA) 656 which in turn is coupled to a receive reject filter (RRF) 658. The RRF 658 is coupled to the T/C diplexer 654.

The second SDST 650 is coupled to a second T/C diplexer 660. The first T/C diplexer 654 and the second T/C diplexer 660 may be coupled to a second 3 dB hybrid 662. The second 3 dB hybrid 662 may be coupled to a T/C bicone antenna 664 or the like and to a third 3 dB hybrid 666. The third 3 dB hybrid 666 may be coupled to a T/C forward pipe antenna 668 and a T/C aft pipe antenna 670. The forward and aft telemetry and command (T/C) pipe antennas 668 and 670 and the telemetry and command (T/C) bicone antenna 664 may provide control and monitoring functions on the communications satellite. The forward and aft pipe antennas 668 and 670 and the bicone antenna 664 may provide nearly a $4\pi$ steradian coverage.

The communications and control circuitry 600 may also include an attitude determination and control subsystem (ADCS) 672. The ADCS 672 may include one or more sun sensors 674 and one or more moon sensors 676. The ADCS 672 may be coupled to the TTCU 646. Each Sun sensors 674 may be a V-slit sun sensor or the like to provide spin rate and one axis of attitude determination. Each moon sensor 676 may be a spinning moon sensor which may be a modified spinning Earth sensor or the like to provide a second axis of attitude. Time-of-arrival among the sensors 674 and 676, as recorded and telemetered by the TTCU 646 may determine the spin attitude of the satellite. Attitude control may be achieved by ground-computed pulsed thruster firing to establish the desired attitude. A stable spin condition with substantial momentum and relatively little disturbance allows control through a ground station on an infrequent basis and obviates a need for any type of on-board control. During lunar or planetary orbit operations, the attitude can be touched up to maximize communications performance, if desired, by peaking an unmodulated return signal.

The satellite communications and control circuitry (S/C) 600 may also include a power subsystem 678 to provide power to the S/C loads. The power subsystem 678 may include a solar array 680. The solar array may include triple junction GaAs solar cells or the like. During eclipses power may be provided by a Lithium-Ion battery system 682. The Lithium-Ion battery system 682 may include 8 cells in series (allowing for one failure).

A high power zener diode 684 may be provided to dissipate excess power, and to provide battery smoothing of the array power. Solar array latch up may be avoided by assuring that there is a 25% excess array margin at eclipse exit which may occur due to a combination of array peaking, no drive conditions on the repeater during eclipse and load margin. A battery electronics unit (BEU) 686 may provide cell balancing.

Figure 7:
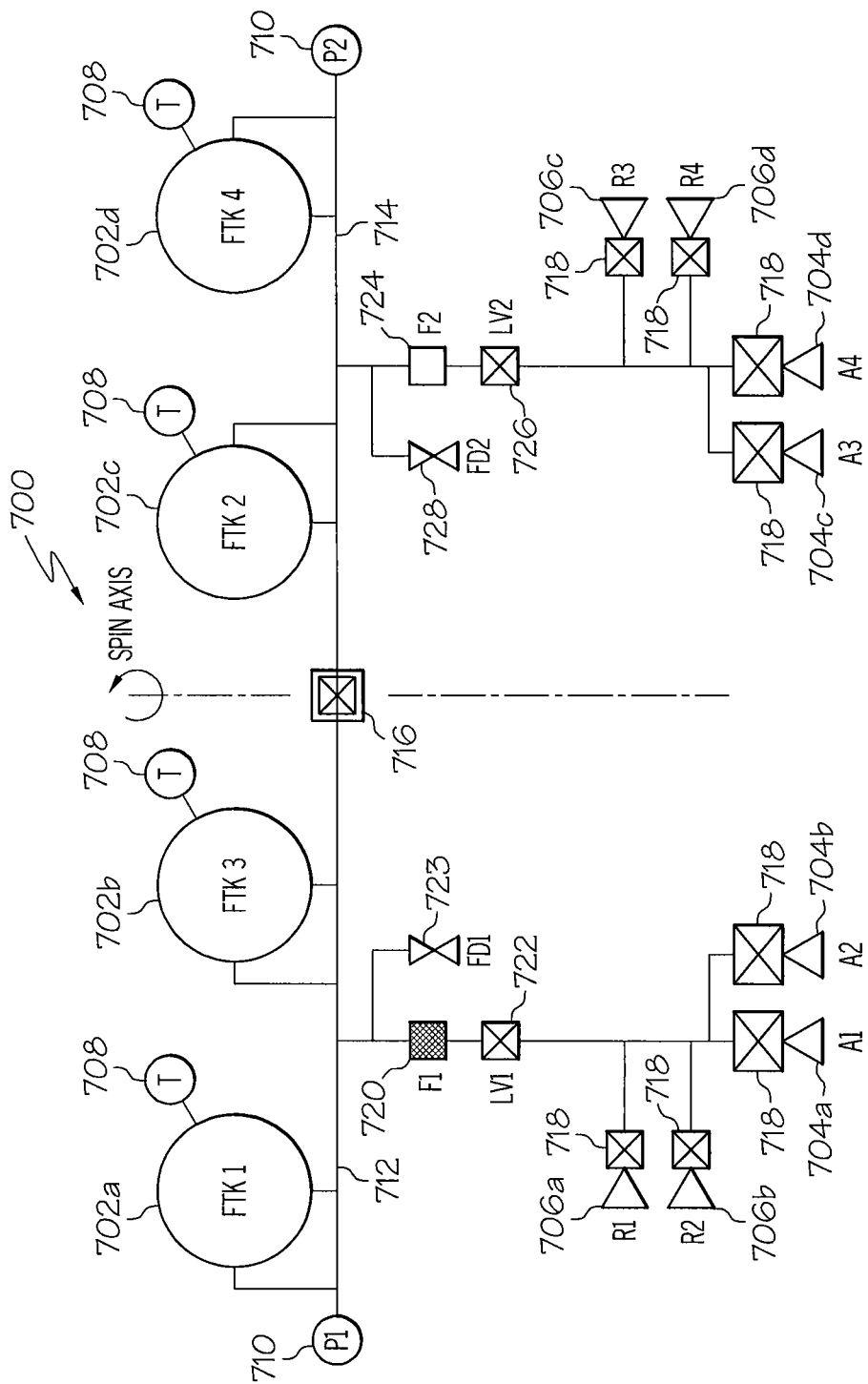
FIG. 7 is a block schematic diagram of an example of a propulsion subsystem for a communications satellite or spacecraft in accordance with an embodiment of the present invention.

FIG. 7 is a block schematic diagram of an example of a propulsion subsystem 700 for a communications satellite, such as the satellite 500 in FIG. 5, in accordance with an embodiment of the present invention. The propulsion system 700 may be a blowdown monopropellant hydrazine ($N_2H_4$) propulsion subsystem or similar propulsion system. The system 700 may employ four titanium propellant tanks 702, four axial thrusters 704, and four radial thrusters 706. A temperature sensor 708 may be associated with each propellant tank 702. A pressure transducer 710 may also sense pressure on each propellant feed line 712 and 714. Tanks 702a and 702b may be connected to propellant feed line 712 and tanks 702c and 702d may be connected to feed line 714. An interconnect latch valve 716 may interconnect feed lines 712 and 714.

A valve 718 may be associated with each thruster 704 and 706. Thrusters 704a, 704b, 706a and 706b may be coupled to the feed line 712 by a first filter 720 and an isolation valve 722. A fill and drain valve 723 may be connected between the first filter 720 and the feed line 712.

A second filter 724 and isolation valve 726 may connect the feed line 714 to each of the valves 718 for thrusters 704c, 704d, 706c, and 706d, respectively. A second fill and drain valve 728 may be connected between the second filter 724 and the feed line 714.

The block diagrams in the Figures illustrate the architecture, functionality, and operation of possible implementations of systems and methods according to various embodiments of the present invention. In this regard, each block in the block diagrams may represent a module, component, element or segment. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems which perform the specified functions or acts, or combinations of special purpose hardware.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for communications between a lunar or planetary surface of a celestial body and the Earth, comprising:
a first communications satellite adapted to be positioned in a predetermined orbit around the celestial body other than the Earth;
a first antenna mounted on the first communications satellite, the first antenna including a predetermined beam shape for communications between the first communications satellite and an asset on the lunar or planetary surface other than the Earth, wherein the first antenna generates a substantially conically-shaped beam, wherein the first antenna is duplexed to transmit and receive signals from the asset on the lunar or planetary surface;
a second antenna mounted on the first communications satellite, the second antenna including a selected beam shape for communications between the first communications satellite and the Earth, wherein the second antenna comprises a toroidal antenna that generates a substantially toroidally-shaped beam, wherein the second antenna is duplexed to transmit and receive signals from the Earth;
wherein the first communications satellite is spin stabilized about a spin axis, the substantially conically-shaped beam including a vertex on the spin axis and extending symmetrically about the spin axis, and the substantially toroidally-shaped beam extending perpendicular to the spin axis; and
a communications system for relaying communications between the first and second antennas, the system providing two-way data communications between the asset on the lunar or planetary surface and the Earth.

2. The system of claim 1, wherein the predetermined obit comprises one of a substantially circular polar orbit, an eccentric polar orbit, and a non-polar orbit.

3. The system of claim 1, wherein the first antenna comprises a configuration to provide a substantially conically shaped beam.

4. The system of claim 1, wherein the second antenna comprises a configuration to provide a substantially toroidally-shaped beam.

5. The system of claim 1, wherein the first communications satellite is spin-stabilized and comprises a spin axis substantially perpendicular to an orbit plane of the celestial body.

6. The system of claim 1, further comprising:
a second communications satellite adapted to be positioned in a predetermined orbit relative to the celestial body and the first communications satellite;
a first antenna mounted on the second communications satellite, the first antenna including a predetermined beam shape for communications between the second communications satellite and the asset on the lunar or planetary surface;

a second antenna mounted on the second communications satellite, the second antenna including a selected beam shape for communications between the second communications satellite and the Earth; and a communications repeater for relaying communications between the first and second antennas on the second communications satellite.

7. The system of claim 6, wherein the first and second communications satellites are configured to comprise a double-hop relay system for communications coverage of both poles of the celestial body and a farside of the celestial body.

8. The system of claim 6, wherein the first antenna of each communications satellite comprises a configuration for communications between each communications satellite and the asset on the lunar or planetary surface and wherein the second antenna of each communications satellite comprises a configuration for communications with the asset on the lunar or planetary surface as well as with the Earth to provide communications with the farside of the celestial body and each pole of the celestial body.

9. The system of claim 6, wherein the first antenna of each communications satellite comprises a configuration for communications between each communications satellite and the asset on the lunar or planetary surface and wherein the second antenna of each communications satellite comprises a configuration for communications with the asset on the lunar or planetary surface, communications between the communications satellites and communications between each satellite and the Earth to provide communications with the farside of the celestial body and each pole of the celestial body.

10. The system of claim 6, wherein the predetermined orbit comprises an eccentric polar orbit.

11. The system of claim 6, further comprising:
a third and fourth communications satellite each adapted to be positioned in a predetermined orbit relative to the celestial body and the first and second communications satellites to provide substantially continuous communications with the asset on the lunar or planetary surface;

a first antenna mounted respectively on each of the third and fourth communications satellites, each first antenna including a predetermined beam shape for communications between at least the respective third and fourth communications satellite and the asset on the lunar or planetary surface;

a second antenna mounted respectively on each of the third and fourth communications satellites, each second antenna including a selected beam shape for communications between at least the respective third and fourth communications satellite and the Earth; and a communications repeater associated with each of the third and fourth communications satellites for relaying communications between the first and second antennas of the associated communications satellite.

12. The system of claim 11, wherein the first, second, third and fourth communications satellites are configured to comprise a double relay system for substantially continuous communications coverage of both poles of the celestial body and a farside of the celestial body.

13. The system of claim 11, wherein the asset comprises at least one of a penetrator, a mortar fired sensor, a robotic or crewed lander, a rover, a robotic emplacement, an observatory and a fixed base.

14. The system of claim 1, wherein the first communications satellite comprises:
a propulsion subsystem to control a positioning and attitude of the first communications satellite;

a power subsystem for providing electrical power to components and other subsystems of the communications satellite;

a telemetry and command subsystem to monitor and control operation of the communications satellite; and an attitude and control subsystem to control an attitude and orientation of the communications satellite.

15. The system of claim 1, wherein the first antenna and the second antenna are mounted on opposite ends of the first communications satellite.

16. A communications satellite for communications between a lunar or planetary surface of a celestial body and the Earth, comprising:
a first antenna mounted on the communications satellite, the first antenna including a predetermined beam shape for communications between the communications satellite and an asset on the lunar or planetary surface of the celestial body other than the Earth, the communications satellite being in an orbit around the celestial body, wherein the first antenna generates a substantially conically-shaped beam, wherein the first antenna is duplexed to transmit and receive signals from the asset on the lunar or planetary surface;

a second antenna mounted on the communications satellite, the second antenna including a selected beam shape for communications between the communications satellite and the Earth, wherein the second antenna comprises a toroidal antenna that generates a substantially toroidally-shaped beam, wherein the second antenna is duplexed to transmit and receive signals from the Earth wherein the first communications satellite is spin stabilized about a spin axis, the substantially conically-shaped beam including a vertex on the spin axis and extending symmetrically about the spin axis, and the substantially toroidally-shaped beam extending perpendicular to the spin axis; and a communications system for relaying communications between the first and second antennas, the communications satellite providing two-way data communications between the asset on the lunar or planetary surface and the Earth.

17. The communications antenna of claim 16, wherein the first antenna comprises a configuration to provide a substantially conically shaped beam.

18. The communications antenna of claim 16, wherein the second antenna comprises a configuration to provide a substantially toroidally-shaped beam.

19. The communications satellite of claim 16, further comprising an attitude determination and control subsystem to cause the communications satellite to be spin-stabilized with a spin axis substantially perpendicular to an orbit plane of the celestial body.

20. The communications satellite of claim 16, further comprising a propulsion subsystem to maintain and control an orbit and orientation of the communications satellite.

21. The communications satellite of claim 16, further comprising a power subsystem to provide electrical power to components and other subsystems of the communications satellite.

22. The communications satellite of claim 16, further comprising a telemetry and command subsystem to monitor and control operation of the communications satellite.

23. The communications satellite of claim 16, further comprising a thermal control subsystem to control a temperature of components and other subsystem of the communications satellite.

24. The communications satellite of claim 16, wherein the communications system is configured for communications based on at least one of time division multiple access, frequency division multiple access, code division multiple access and an internet protocol.

25. The communications satellite of claim 16, wherein the communications system comprises an internet protocol router.

26. The system of claim 16, further comprising:
spin-stabilizing the communications satellite; and
orienting the communications satellite with a spin axis being substantially perpendicular to a plane of an orbit of the celestial body.

27. The system of claim 16, further comprising orbiting the celestial body by the communications satellite in a predetermined orbit.

28. The system of claim 16, further comprising:
receiving communications from the asset on the surface of the celestial body by one of the communications satellite and another communications satellite;
relaying the communications from the asset from one of the communications satellite and the other communications satellite to the other communications satellite; and
transmitting the relayed communications from the asset to earth from one of the communications satellite and the other communications satellite.

* * * * *